United States Patent

[11] 3,616,237

[72] Inventors Howard Newman
Monsey, N.Y.;
Ping Shu, Pomona, N.Y.; William W. Andres, Lindenhurst, Ill.
[21] Appl. No. 44,633
[22] Filed June 8, 1970
[23] Division of Ser. No. 741,256, July 1, 1968, Pat. No. 3,432,714
[45] Patented Oct. 26, 1971
[73] Assignee American Cyanamid Company
Stamford, Conn.

[54] METHOD OF PREPARING THIOGRISEOFULVINS
7 Claims, No Drawings
[52] U.S. Cl. .................................................... 195/80
[51] Int. Cl. .................................................... C12d 9/00
[50] Field of Search .......................................... 195/80

[56] References Cited
UNITED STATES PATENTS
3,557,151   1/1971   Andres et al. ............. 195/80 X Primary Examiner—Joseph M. Golian
Attorney—Ernest Y. Miller ABSTRACT: The compounds, (+)-1-thiogriseofulvin and (+)-5'-hydroxy-1-thiogriseofulvin, are prepared by cultivation of *Streptomyces cinereocrocatus* under controlled aerobic conditions with substrate dehydro-1-thiogriseofulvin. The compounds have antifungal activity.

METHOD OF PREPARING THIOGRISEOFULVINS

This application is a Division of our application Ser. No. 741,328 filed July 1, 1968, now U.S. Pat. No. 3,432,714 and is related to application Ser. No. 741,256, filed July 1, 1968, now U.S. Pat. No. 3,530,146, said relationship being described hereinafter.

SUMMARY OF THE INVENTION

This invention relates to the compounds (+)-1-thiogriseofulvin and (+)-5'-hydroxy-1-thiogriseofulvin, produced by fermentation, and methods for their recovery and purification.

The invention, is based on the discovery that the fermentation of selected substrates under controlled conditions with a strain of Streptomyces cinereocrocatus n.s. (Lederle AC-209) leads to the formation of (+)-1-thiogriseofulvin and (+)-5"-hydroxy-1-thiogriseofulvin. The invention includes within its scope the compounds as crude concentrates and in their crystalline forms.

The compounds produced by the present process may be illustrated by the following formula:

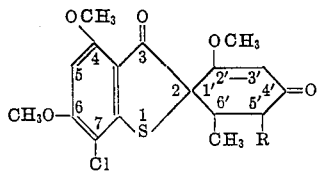

wherein R is selected from the group consisting of hydrogen and hydroxyl.

The new species, S. cinereocrocatus 'n.s., was isolated from the soil sample collected in the State of Ohio. A viable culture of the organism (Lederle AC-209) has been deposited with the Culture Collection Laboratory, Northern Utilization Research and Development Division, United States Department of Agriculture, Peoria, Illinois and has been added to its permanent collection and is freely available to the general public as NRRL 3443.

The following is a general description of the organism S. cinereocrocatus N.S. based on the diagnostic characteristics observed. The underscored descriptive colors are taken from Jaconson, et al., "Color Harmony Manual" 3rd Ed. Container Corp. of America, Chicago, (1948).

Amount of Growth

Moderate to good to heavy on most media.

Aerial Mycelium and/or en masse Spore Color

Aerial mycelium yellowish on most media; sporulation grayish, approximating Ashes (5 fe to 7 fe), good to heavy on most media.

Soluble Pigments

Yellowish on several media; light to moderate when present. Absent on Czapek's Solution, yeast extract, Bennett's and inorganic salt-starch agars.

Reverse Color

In yellowish shades on most media.

Miscellaneous Physiological Reactions

Nitrates not reduced to nitrites in organic nitrate broth; no liquefaction of gelatin; no melanin produced on peptone-iron agar. Carbon source utilization according to the Pridham and Gottlieb [J. Bact. 56: 107–114 (1948)] method as follows: Fair to good utilization of 1-arabinose, d-fructose, sucrose, d-trehalose, d-xylose and dextrose; poor to nonutilization of adonitol, i-inositol, lactose, d-mannitol, d-melezitose, d-melibiose, d-raffinose, 1-rhamnose and salicin.

Micromorphology

Spores in straight to well-formed but loosely spiralled chains. Spores mostly elongate to somewhat elliptical, 0.5–0.6 $\mu \times 1.1-\mu$. Smooth walled as determined by electron microscopy at 8,000X.

The culture (Lederle AC-209) possessed several well-defined characteristics, which individually were not unusual, but in their existing combination they were significantly different from other previously described Streptomyces species. Searches through devised keys and culture description failed to produce a suitable identification of the organism. Likewise, when comparisons were made of (AC-209) with all available reference specimens of streptomycetes having similar basic features, none correspond closely enough to be considered synonymous. As a result of the novelty of the culture, a new species named Streptomyces cinereocrocatus n.s. is proposed to be descriptive of the ash-gray color of the spores coupled with the yellow color of the vegetative mycelium.

Observations were made of the culture, morphological and physiological characteristics of the new species Streptomyces cinereocrocatus in accordance with the methods detailed by Shirling et al., Internat. Journ. of Syst. Bacteriol. 16:313–340 (1966). Media used in the studies are selected from those recommended by Pridham et al. Antibiotics Annual (1956–1957 pages 947–953 for the cultivation of streptomycetes. Details are recorded in tables I–IV as follows. The underscored descriptive colors are taken from Jacobson et al., "Color Harmony Manual," 3rd Edit. Container Corp. of America, Chicago, 1948.

TABLE I

Cultural Characteristics of Streptomyces cinereocrocatus NRRL No. 3443

(Incubation: 14 days  Temperature: 28° C.)

| Medium | Amount of growth | Aerial mycelium and/or spores | Soluble pigment | Reverse color | Remarks |
|---|---|---|---|---|---|
| Czapek's solution agar | Good | Aerial mycelium yellowish, becoming Covert Gray (2 fe) in sporulation zones. Sporulation good. | None | Pastel yellow (1½ fb). | |
| Asparagine dextrose agar. | ...do | Aerial mycelium yellowish, becoming Ashes (5 fe) to (7 fe) in sporulation zones. Sporulation good. | Yellowish; light. | ...do | Colony margins stoloniferous. |
| Tomato paste agar | Heavy | Aerial mycelium yellowish, becoming Ashes (5 fe) in sporulation ones. Sporulation good. | Yellowish; moderate. | Amber (3 lc) | |
| Hickey and Tresner's agar. | ...do | Aerial mycelium yellowish, becoming Ashes (5 fe) in sporulation zones. Sporulation heavy. | Yellowish; light. | Mustard (2 le) | Do. |
| Yeast extract agar | ...do | Aerial mycelium yellowish, becoming Ashes (5 fe) in (7 fe) in sporulation zones. Sporulation very heavy. | None | Pastel yellow (1½ fb). | Do. |
| Kuster's oatflake agar | ...do | Aerial mycelium yellowish-white, becoming Ashes (5 fe) in sporulation zones. Sporulation very heavy. | Yellowish; light. | Lt. antique gold (1½ ic). | Colonies spreading broadly. |
| Tomato paste oatmeal agar. | ...do | Aerial mycelium yellowish, becoming Ashes (5 fe) to (7 fe) in sporulation zones. Sporulation very heavy. | Yellowish; moderate. | Amber (3 lc) | Colonies spreading. |
| Potato dextrose agar | ...do | Aerial mycelium yellowish, becoming Ashes (5 fe) to (7 fe) in sporulation zones. Sporulation heavy. | Yellowish; light. | ...do | Colonies spreading; margins stoloniferous. |
| Bennett's agar | Good | Aerial mycelium yellowish, becoming Ashes (5 fe) in sporulation zones. Sporulation moderate. | None | Mustard (2 le) | |
| Inorganic salts—starch agar. | Moderate | Aerial mycelium yellowish-white, becoming grayish in sporulation areas. Sporulation very light. | ...do | Parchment (1½ db). | |

TABLE II
Micromorphology of *Streptomyces cinereocrocatus* NRRL No. 3443

| Medium | Aerial mycelium and/or sporiferous structures | Spore shape | Spore size, μ | Spore surface |
|---|---|---|---|---|
| Kuster's oatflake Agar. | Aerial mycelium loose. Sporiferous branches occurring as a mixture of straight and well-formed, but loosely spiralled spore chains. | Mostly elongate to somewhat elliptical. | 0.5-0.6 x 1.1-1.5 | Spore surface smooth as determined by electron microscopy at 8,000X. |

TABLE III
Miscellaneous Physiological Reaction of *Streptomyces cinereocrocatus* NRRL
(Temperature: 28° C.)

| Medium | Incubation period | Amount of growth | Physiological reaction | Remarks |
|---|---|---|---|---|
| Organic nitrate broth. | 7 days | Good | Nitrates not reduced. | |
| Do | 14 days | do | do | |
| Gelatin | 7 days | do | No liquification. | |
| Do | 14 days | do | do | |
| Peptone-iron agar | 24 hours | do | No melanin produced | |

TABLE IV
Carbon Source Utilization Pattern of Streptomyces Cinereocrocatus NRRL No. 3443
(Incubation time 10 days and temperature 28° C.)

| Carbon Source | Utilization* |
|---|---|
| Adonital | 1 |
| l-Arabinose | 3 |
| d-Fructose | 3 |
| i-Inositol | 0 |
| Lactose | 1 |
| d-Mannitol | 1 |
| Melezitose | 1 |
| d-Melibiose | 1 |
| d-Raffinose | 1 |
| l-Rhamnose | 1 |
| Salicin | 1 |
| Sucrose | 2 |
| d-Trehalose | 2 d-Xylose |
| Dextrose | 3 |
| Negative Control | 0 |

*3—Good Utilization  1—Poor Utilization
2—Fair Utilization  0—No utilization

It is intended that for the production of the described compounds the present invention is not limited to this particular organism only, nor to organisms fully answering the above growth and microscopic characteristics which are given for illustrative purposes. In fact, it is described and intended to include the use of mutants produced from the described organism by various means, such as x-radiation, ultraviolet radiation, nitrogen mustard, phage exposure and the like.

The production of (+)-1-thiogriseofulvin and (+)-5'-hydroxy-1-thiogriseofulvin may be illustrated schematically as follows:

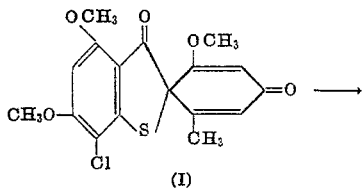

(I)

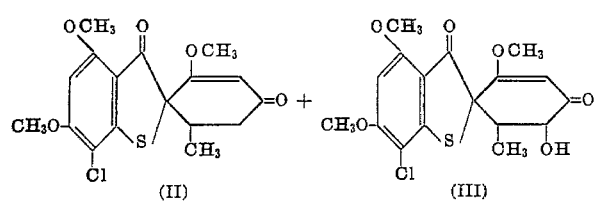

(II)  (III)

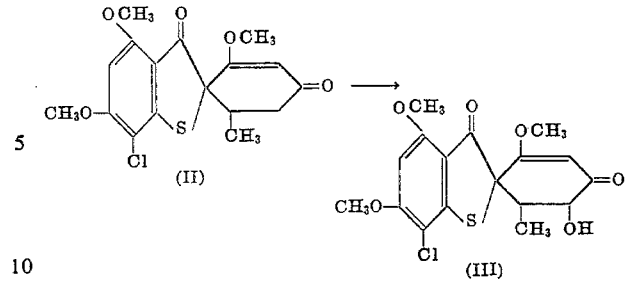

(II)  (III)

The preparation of dehydro-1-thiogriseofulvin is described and claimed in an application of coworkers H. Newman and R. B. Angier, Ser. No. 741,256, filed July 1, 1968 now Pat. No. 3,530,146 and also described hereinafter in the examples.

THE FERMENTATION PROCESS

Cultivation of the organism *S. cinereocrocatus* n.s. NRRL No. 3,443 may be carried out in a wide variety of liquid culture media. Media which are useful for the production of (+)-1-thiogriseofulvin and (+)-5'-hydroxy-1-thiogriseofulvin include an assimilable source of carbon such as starch, sugar, molasses, glycerol, etc., an assimilable source of nitrogen such as protein, protein hydrolysate, polypeptides, amino acids, corn steep liquor, etc., and inorganic anions and cations, such as potassium, sodium, calcium, sulfate, phosphate, chloride, etc. Trace elements such as boron, molybdenum, copper, etc., and supplied as impurities of other constituents of the media. Aeration in tanks and bottles is provided by forcing sterile air through or onto the surface of the fermenting medium. Further agitation in tanks is provided by a mechanical impeller. An antifoaming agent, such as lard oil may be added as needed. Substrate, dissolved in appropriate solvent, as for example, methanol or acetone, is added to the fermentation mash after a suitable fermenting preincubation period.

INOCULUM PREPARATION

Shaker flask "seed" inoculum is prepared by inoculating 100 milliliter portions of sterile medium in 500 milliliter flasks with scrapings or washings of spores from an agar slant of the culture. Either of the following two media are ordinarily used.

| Bacto-peptone | 4 grams |
|---|---|
| | (med. No. 13) |
| Glucose | 10 grams |
| Beef extract | 4 grams |
| Sodium chloride | 2.5 grams |
| Yeast extract | 1 gram |
| Water to | 1,000 milliliters | or

| Corn starch | 30 grams |
|---|---|
| | (med. No. 48-2) |
| Molasses | 20 grams |
| Soy flour X200 | 10 grams |
| Calcium carbonate | 10 grams |
| Yeast extract | 2.5 grams |
| Water to | 1,000 milliliters |

The flasks are incubated at a temperature from 20°–35° C. preferably from 25° to 29° C. and usually about 28° C., and agitated vigorously on a rotary shaker for about 48 to 72 hours. These 100 milliliter portions of "seed" inoculum may be used to inoculate shake flask fermentations.

SHAKE FLASK FERMENTATION

For the production of the novel compound in shake flask or tank fermentations, the following fermentation medium is preferably used.

| Corn starch | 30 grams |
|---|---|
| | (med. No. 48-2) |
| Molasses | 20 grams |
| Soy flour X200 | 10 grams |
| Calcium carbonate | 10 grams |
| Yeast extract | 2.5 grams |
| Water to | 1,000 milliliters |

Each shake flask fermentor containing sterile medium is inoculated with 3 to 10 percent of inoculum made as described above. The fermentation mash is maintained at a temperature of 20°–35° C., preferably from 25° to 29° C. and usually about 28° C., and agitated vigorously for 18 to 36 hours on a rotary shaker. Substrate, dissolved in an appropriate solvent, is then added to the fermentation mash usually giving a concentration of from 25 to 125 micrograms of substrate per milliliter of mash. The fermentation is allowed to proceed for an additional 48 to 72 hours, at which time the mash is harvested.

ISOLATION PROCEDURE

After the fermentation is completed, the fermented mash containing the novel compounds of this invention is filtered, preferably at pH 6–7, to remove the mycelium. Diatomaceous earth or any other conventional filtration aid may be used to assist in the filtration. Normally, the mycelial cake is washed with water and the wash is pooled with the filtrate. The combined filtrate and wash is extracted with two portions of chloroform (each portion being about one-third the volume of the filtrate and wash) which are combined and concentrated under reduced pressure to a residue. In place of chloroform, other solvents such as ethyl acetate, butanol, methylene chloride, etc., can be used. This residue is then subjected to partition chromatography on a diatomaceous earth column using a solvent system composed of n-hexane, ethyl acetate, methanol, water (380:120:75:30). The column effluent, continuously monitored using percent transmission at about 245m$\mu$, is collected in separate fractions of suitable volume. The novel compounds of this invention are eluted approximately between the second through fourth and sixth through ninth hold-back-volumes. Fractions of effluent containing the novel compounds of this invention are pooled and the compounds recovered therefrom using standard techniques.

Physical Properties of (+)-1-Thiogriseofulvin

A microanalytical sample of (+)-1-thiogriseofulvin, prepared by crystallization from a mixture of acetone and hexane, followed by drying in vacuo with $P_2O_5$ overnight, has a melting point of 192°–194° C. Optical rotation [$\alpha$] $D^{25}=+321°$ ($\pm 4.5°$) (c=0.670 in $CHCl_3$). Ultraviolet maxima occur at:

In methanol ($\epsilon$); 232 m$\mu$ (35,350), 246 m$\mu$ (36,800), 306 m$\mu$ (15,800), and 345 m$\mu$ (3,900).

The mass spectrum showed a molecular ion at 368. The nmr spectrum (60 Mc$CDCl_3$) showed peaks at 66 cps, doublet (3H); 150 cps, multiplet (3H); 219 cps, singlet (3H); 239 cps, singlet (3H); 242 cps, singlet (3H); 335 cps, singlet (1H); and 377 cps, singlet (1H); relative to TMS.

PHYSICAL PROPERTIES OF (+)-5'-Hydroxy-1-thiogriseofulvin

A microanalytical sample of (+)-5'-hydroxy-1-thiogriseofulvin, prepared by crystallization from a mixture of acetone and hexane, followed by drying in vacuo with $P_2O_5$ overnight has a melting point of 206°–208° C. Optical rotation [$\alpha$] $D^{25}+$ 325° ($\pm 7.3°$) (c=0.410 $CHCl_3$). Ultraviolet maxima occur at:

In methanol ($\epsilon$); 232 m$\mu$ (30,600), 246 m$\mu$ (30,500), 308 m$\mu$ (13,450), 350 m$\mu$ (3,450)

The mass spectrum showed a molecular ion at 384. The nmr spectrum (60 Mc, $CDCl_3$) showed peaks at 74 cps, doublet (3H); 150 cps, multiplet (1H); 219 cps, singlet (3H) 238 cps, singlet (3H); 240 cps, singlet (3H); 284 cps, doublet (1H); 336 cps, singlet (1H) and 375 cps, singlet (1H) relative to TMS.

UTILITY

Both (+)-1-thiogriseofulvin and (+)-5'-hydroxy-1-thiogriseofulvin show significant antifungal activity against a variety of fungi when tested using the agar dilution method. In this procedure graded amounts of test compounds were incorporated in fluid nutrient agar and the mixtures were placed in Petri dishes. Dilute suspensions of the various fungal cultures applied to the hardened agar surfaces. After appropriate incubation periods were examined to determine the lowest concentration levels at which growth of the fungus was inhibited. Table I, below, summarizes results observed.

TABLE I

Antifungal Activity of (+)-1-Thiogriseofulvin and (+)-5'-Hydroxy-1-thiogriseofulvin

| | Minimal Inhibitory Concentrations (micrograms per milliliter) | |
|---|---|---|
| | (+)-1-thio Griseofulvin | (+)-5'-hydroxy-1-Thiogriseofulvin |
| Trichophyton tonsurans | 2.5 | 12.5 |
| Trichophyton mentagrophytes | 5 | 12.5 |
| Trichophyton rubrum | 5 | 12.5 |
| Microsporum canis | 5 | 50 |
| Microsporum gypseum | 12.5 | 12.5 |
| Phialophthora jeanselmei | 50 | 50 |
| Candida albicans | 50 | 50 |
| Cryptococcus neoformans | 50 | 50 |

DETAILED DESCRIPTION

The following examples describe in detail the preparation of dehydro-1-thiogriseofulvin and the fermentation of this substrate to produce (+)-1-thiogriseofulvin and (+)-5'-hydroxy-1-thiogriseofulvin.

EXAMPLE 1

Preparation of 3,5-Dimethoxythiophenol

To a stirred, cooled (ice-water) suspension of 37 g. (0.24 mole) of 3,5-dimethoxyaniline in 200 ml. of water containing 50 ml. (0.6 mole) of concentrated hydrochloric acid is added a solution of 16.6 g. (0.24 mole) of sodium nitrite in 50 ml. of water. The rate of addition is regulated so as not to allow the reaction temperature to exceed 5° C. The resulting red-purple, moderately thick solution of diazonium salt is added over a period of 30 minutes to a stirred solution of 250 g. (1.7 moles) of potassium ethyl xanthate in 200 ml. of water at 85°–90° C. After cooling, the almost black reaction mixture is extracted with ether and the ethereal extracts are washed with dilute sodium hydroxide, water, and then dried and evaporated to dryness. The residual crude xanthate (49 g.) is heated under reflux in 200 ml. of 90 percent ethanol containing 100 g. of potassium hydroxide for 15 hours. The refluxed mixture is then extracted with ether (to remove any base insoluble material) and the basic aqueous phase acidified with concentrated hydrochloric acid. The water insoluble product which separated is extracted with ether and the ethereal extracts are washed, dried and evaporated to yield 23 g. of liquid residue containing the crude desired product. Distillation under reduced pressure from zinc dust gives 12.8 g. (31 percent) of the thiophenol, boiling point 111° C. (0.1 mm.); n$_D^{25}$ 1.5830.

EXAMPLE 2

Preparation of 3,5-Dimethoxythiophenol, acetate

A cooled solution of 2 g. (0.012 mole) of 3,5-dimethoxythiophenol in 4 ml. of dry pyridine is treated with 4 ml. of acetic anhydride. The reaction mixture is kept at room temperature overnight, then poured into ice-water and the product extracted with ether. The ethereal extracts are washed successively with cold dilute hydrochloric acid, cold water, aqueous bicarbonate, dried and evaporated to yield 2.4 g. (96 percent) of the acetate derivative as a colorless, crystalline solid, melting point 61–62.5° C., $\lambda_{max}^{Nujol}$ 5.85 $\mu$.

EXAMPLE 3

Preparation of 2-Chloro-3,5-dimethoxythiophenol, acetate

To a solution of 7.8 g. (0.037 mole) 3,5-dimethoxythiophenol, acetate in 135 ml. of dry benzene is added 5 g. (0.037 mole) of N-chlorosuccinimide. The reaction mixture is stirred and irradiated for 23 hours with a 150 watt (General Electric projector) lamp placed about 4 to 6 inches from the side of the flask. The heat generated by the lamp raised the temperature of the reaction mixture to 77° C. and gives a homogeneous system. (N-chlorosuccinimide is only partially soluble in benzene at room temperature). The course of the reaction is followed by periodic testing of the reaction mixture for active halogen with starch-iodide paper. The test is still weakly positive after 18 hours, but is essentially negative after 21 hours. The orange solution is washed with water, dried and evaporated to yield an oily residue which is heated in a relatively small amount of ether and kept at room temperature overnight. A beige colored solid is obtained (5.3 g.) which melts at 87°–90° C., (soften Ca. 84° C.). An additional 0.87 g. of solid, melting point 81°–86° C., is isolated by concentrating the mother liquors giving a total yield of 6.2 g. (68 percent). An analytical sample is obtained by partially dissolving a sample of the product in boiling ether and collecting the solids after an hour at room temperature; melting point 87°–89.5° C. (softens 85° C.); $\lambda_{max}^{Nujol}$ 5.90 $\mu$.

The corresponding 2-bromo-3,5-dimethoxythiophenol acetate is obtained when N-bromosuccinimide is used in place of N-chlorosuccinimide.

EXAMPLE 4

Preparation of 4-Hydroxy-2'-mercapto-3-chloro-2,4',6'-trimethoxy-6-methylbenzophenone diacetate A mixture of 4.4 g. (0.018 mole) of 2-chloro-3,5-dimethoxythiophenol, acetate, (prepared in example 3) and 4.0 g. (0.018 mole) of isoeverninic acid acetate (H. Newman and A. Durante, *J. Org. Chem.* 31 2,291 (1960)in 60 ml. of trifluoroacetic anhydride is heated in a pressure bottle at 55°–60 C. for 20 hours. The dark solution is evaporated to dryness under reduced pressure and the residue is dissolved in methylene chloride. This solution is washed with aqueous bicarbonate, dried and evaporated to yield a gummy residue which solidifies on trituration with ether. The product, 4-hydroxy-2'-mercapto-3-chloro-2,4',6'-trimethoxy-6-methyl-benzophenone diacetate, a purple-tinged, colorless solid, is obtained by filtration, 2.8 g. (34 percent), melting point 163°–166° C. Heating in boiling methanol, furnishes an analytical sample, melting point 168°–170° C.; $\lambda_{max}^{Nujol}$ 5.67.

The corresponding 4-hydroxy-2'-mercapto-3-bromo-2,4',6'-trimethoxy-5-methylbenzophenone diacetate is obtained when 2-bromo-3,5-dimethoxythiophenol acetate, (prepared in example 3) is used as starting material in the above reaction.

EXAMPLE 5

Preparation of 4-Hydroxy-2'-mercapto-3-chloro-2,4',6'-trimethoxy-6-methylbenzophenone Nitrogen is bubbled through a stirred suspension of 2.5 g. (0.055 mole) of 4-hydroxy-2'-mercapto-3-chloro-2,4',6'-trimethoxy-6-methylbenzophenone diacetate, prepared in example 4) in 40 ml. of methanol at room temperature and 40 ml. of 2N aqueous sodium hydroxide is added in a period of about 3 minutes. Stirring is continued until the reaction mixture is homogeneous, about 10 to 15 minutes. The nitrogen passage is terminated, the flask stoppered and kept at room temperature for an additional 75 minutes. Ice is then added to the solution and the cold solution is acidified with cold, fairly concentrated hydrochloric acid. The practically colorless gum which separates, solidifies almost immediately and is collected after 15 minutes and air dried overnight; yield 2.0 g. (99 percent), melting point 195°–199° C. Recrystallization from aqueous methanol gives an analytical sample, melting point 198°–199° C. $\lambda_{max}^{Nujol}$ 2.90 $\mu$ and 6.33 $\mu$. The latter bend shows two inflections, at 6.13 and 6.23 $\mu$.

Following the above procedure and using as starting material 4-hydroxy-2'-mercapto-3-bromo-2,4',6'-trimethoxy-6-methylbenzophenone diacetate the product 4-hydroxy-2'-mercapto-3-bromo-2,4',6'-trimethoxy-6-methylbenzophenone, is obtained.

EXAMPLE 6

Preparation of 7-Chloro-2',4,6-trimethoxy-6'-methyl-spiro-[benzo][ ]thiophene-2(3H),1'-[2,5]cyclohexadiene]-3,4'-dione (dehydro-1-thiogriseofulvin)

A solution of 1.7 g. (0.0046 mole) of 4-hydroxy-2'-mercapto-3-chloro-2,4',6'-trimethoxy-6-methylbenzophenone in 150 ml. of water containing 25 g. of potassium carbonate is added dropwise over a period of about 10 minutes to a stirred solution of 6 g. (0.018 mole) of potassium ferricyanide in 75 ml. of water. The solid, which starts to separate almost immediately, is collected after one hour of additional stirring. The solid is suspended in boiling ethanol and again collected; yield 1.3 g. (77 percent), melting point 235°–238° C. A portion of this product is again heated in boiling ethanol to furnish an analytical sample of 7-chloro-2',4,6-trimethoxy-6'-methyl-spiro-[benzo][bbhthiophene-2(3H),1'-[2,5]cyclohexadiene]-3,4'-dione, melting point 236°–238° C. $\lambda_{max}^{Nujol}$ 5.90 and 6,02$\mu \lambda_{max}^{MeOH}$ 348 ($\epsilon$ 4,550), 306 ($\beta$18,700) and 235 $\mu$($\epsilon$43,300).

EXAMPLE 7

Microbiological Conversion of Dehydro-1-thiogriseofulvin into (+)-1-Thiogriseofulvin and (+)-5'-Hydroxy-1-thiogriseofulvin A typical medium used to grow the primary inoculum is prepared according to the following formula:

(Med. 48–2)
| | |
|---|---|
| Cornstarch | 30grams |
| Molasses | 20grams |
| Soy flour X200 | 10grams |
| Calcium carbonate | 10grams |
| Yeast extract | 2.5 grams |
| Water to | 1,000 milliliters |

The washed or scraped spores from an agar slant of *S. cinereocrocatus* n.s. are used to inoculate one 500 milliliter flask containing 100 milliliters of the above medium. The flask is placed on a rotary shaker and agitated vigorously for about 48 hours at 28° C. after which time the contents are used to inoculate 500 milliliter shake flask fermentations.

Fermentation (B)

A fermentation medium is prepared according to the formulation (med. 48–2) as described above in this example. The fermentation medium is sterilized at 120° C. with 15 pounds of pressure p.s.i. for about 20 minutes. Fifty 500 milliliter flasks containing 100 milliliters each of the sterilized medium are each inoculated with 5 milliliters of inoculum prepared as described above in this example. The flasks are then incubated at 28° C. for about 24 hours while being vigorously agitated on a rotary shaker. At the completion of the 24 hour fermentation period, 2-milliliters of a 5 milligram per milliliter solution of dehydro-1-thiogriseofulvin (prepared in example 6) in methanol are aseptically added to each flask producing a concentration of 100 mcg. of substrate per milliliter of fermentation medium. The flasks are then further incubated at 28° C. for about 48 hours while being vigorously agitated on a rotary shaker, after which time the fermentation mash is harvested. Thin layer chromatography is used to follow the progress of the reaction. Cellulose strips, Eastman cellulose with fluorescent indicator–MN Polygram cell 300/UV-, impregnated with the lower phase of the solvent system composed of hexane, ethyl acetate, methanol and water in the ratio 70:30:15:6 are suitable. Spots are detected by ultraviolet light. Dehydro-1-thiogriseofulvin, (+)-1-thiogriseofulvin and (+)-5'-hydroxy-1-thiogriseofulvin have $R^f$ 0.78, $R_f$ 0.92 and $R_f$ 0.65, respectively, in this system.

Isolation c

Five liters of fermentation mash is clarified by filtration through Hyflo and the filtrate extracted with one-half volume of chloroform. The chloroform extract is dried using anhydrous sodium sulfate, which later is removed by filtration, and concentrated to a residue (wt. 530 mg. under reduced pressure. The residue is purified by means of adsorption column chromatography on silica gel (40 grams). The column is prepared by slurrying the adsorbant in an appropriate volume of chloroform and purifying the slurry into a glass column. The residue, dissolved in a minimal amount of chloroform, is charged onto the column. The column is developed with additional chloroform. The eluate containing both (+)-1-thiogriseofulvin and (+)--hydroxy-1-thiogriseofulvin is concentrated to a residue (wt. 27 mg. under pressure.

The residue obtained above is further purified by means of partition chromatography on diatomaceous earth. The column support is prepared by mixing 0.50 ml. of the lower phase from the system n-hexane, ethyl acetate, methanol and water (380:120:75:30 ) with each one gram of diatomaceous earth. The wet support is used to pack a glass column. The residue, dissolved in a small amount of lower phase is charged onto the diatomaceous earth column. The column is then eluted with the upper phase of the described solvent system collecting the effluent in separate fractions of suitable volume. The column development is followed by monitoring the effluent with optical density readings at 245 m$\mu$. (+)-1-thiogriseofulvin is eluted in the second through fourth hold-back-volumes, and (+)-5'-hydroxy-1-thiogriseofulvin is eluted from the sixth through the ninth hold-back-volumes. Appropriate effluent fractions are combined and concentrated under reduced pressure to dryness. The residues are recrystallized from a mixture of acetone and hexane. About 12 mg. of (+)-1-thiogriseofulvin, melting point 188°–189° C. and 6 mg. of (+)-5'-hydroxy-1-thiogriseofulvin, melting point 202°–203° C. are obtained.

We claim:

1. A method of preparing a compound of the formula:

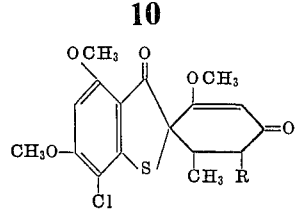

wherein R is selected from the group consisting of hydrogen and hydroxyl, which comprises subjecting dehydro-1-thiogriseofulvin to fermentation in an aqueous nutrient medium containing assimilable sources of carbohydrate, nitrogen and inorganic salts, under aerobic conditions, in the presence of *Streptomyes cinereocrocatus* and recovering said compound therefrom.

2. A method according to claim 1 wherein (+)-1-thiogriseofulvin is recovered.

3. A method according to claim 1, wherein (+)-5'-hydroxy-1-thiogriseofulvin is recovered.

4. A method in accordance with claim 1, in which the product is recovered by extraction with a solvent and partition chromatography.

5. A method in accordance with claim 1, in which the product is extracted from the fermentation mash with chloroform and purified by partition chromatography.

6. A method which comprises cultivating *Streptomyces cinereocrocatus* NRRL No. 3443 in an aqueous nutrient medium containing assimilable sources of carbohydrate, nitrogen and inorganic salts under aerobic conditions for a period of from 18 to 72 hours and at a temperature of from 20° to 35° C. in the presence of dehydro-1-thiogriseofulvin and recovering (+)-5'-hydroxy-1-thiogriseofulvin therefrom.

7. A method which comprises cultivating *Streptomyces cinereocrocatus* NRRL No. 3443 in an aqueous nutrient medium containing assimilable sources of carbohydrate, nitrogen and inorganic salts under aerobic conditions for a period of from 18 to 72 hours and at a temperature of from 20° to 35° C. in the presence of dehydro-1-thiogriseofulvin and recovering (+)-1-thiogriseofulvin therefrom.